United States Patent
Haas et al.

(10) Patent No.: US 9,619,158 B2
(45) Date of Patent: Apr. 11, 2017

(54) TWO-LEVEL HIERARCHICAL LOG STRUCTURED ARRAY ARCHITECTURE WITH MINIMIZED WRITE AMPLIFICATION

(71) Applicant: International Business Machines Corporation, Armonk, NY (US)

(72) Inventors: Robert Haas, Adliswil (CH); Nikolas Ioannou, Zurich (CH); Ioannis Koltsidas, Zurich (CH); Roman A. Pletka, Uster (CH); Andrew D. Walls, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 112 days.

(21) Appl. No.: 14/573,853

(22) Filed: Dec. 17, 2014

(65) Prior Publication Data
US 2016/0179410 A1    Jun. 23, 2016

(51) Int. Cl.
G06F 3/06 (2006.01)
G06F 11/10 (2006.01)
G06F 12/02 (2006.01)

(52) U.S. Cl.
CPC ............ G06F 3/0619 (2013.01); G06F 3/061 (2013.01); G06F 3/0616 (2013.01);
(Continued)

(58) Field of Classification Search
CPC ...... G06F 3/061; G06F 3/0616; G06F 3/0619; G06F 3/0652; G06F 3/0655; G06F 3/0688;
(Continued)

(56) References Cited

U.S. PATENT DOCUMENTS 5,488,701 A    1/1996    Brady et al.
5,530,850 A *  6/1996    Ford ..................... G06F 3/0601
                                                      707/813
(Continued)

FOREIGN PATENT DOCUMENTS

GB    2366014 A    2/2002
WO    WO2011/153478 A2    12/2011
WO    WO2012/062233 A1    5/2012

OTHER PUBLICATIONS

List of IBM Patents or Patent Applications Treated as Related (Appendix P), 2 pages.
(Continued)

*Primary Examiner* — Aracelis Ruiz
(74) *Attorney, Agent, or Firm* — Stephen R. Tkacs; Stephen J. Walder, Jr.; Randall J. Bluestone

(57) ABSTRACT

A mechanism is provided for coordinated garbage collection in an array controller of a two-level hierarchical log structured array architecture for a non-volatile memory array. The two-level hierarchical log structured array (LSA) architecture comprises an array-level LSA in the array controller and a node-level LSA in each node of the non-volatile memory array. The array controller writes logical pages of data to containers in memory of the array-level storage controller at node logical block addresses in an array-level LSA. The array-level LSA maps the host logical block addresses to node logical block addresses in a node-level LSA in a plurality of nodes. Responsive to initiating array-level garbage collection in the array controller, the mechanism identifies a first container to reclaim according to a predetermined garbage collection policy. Responsive to determining the first container has at least a first valid logical page of data, the mechanism moves the first valid logical page of data to a location assigned to the same node in a target container in the memory of the array-level storage control- (Continued)

ler, remaps the first valid logical page of data in a corresponding node, and reclaims the first container.

20 Claims, 7 Drawing Sheets

(52) U.S. Cl.
CPC .......... *G06F 3/0652* (2013.01); *G06F 3/0655* (2013.01); *G06F 3/0688* (2013.01); *G06F 11/108* (2013.01); *G06F 11/1072* (2013.01); *G06F 11/1096* (2013.01); *G06F 12/0246* (2013.01); *G06F 2201/84* (2013.01); *G06F 2212/7201* (2013.01); *G06F 2212/7205* (2013.01); *G06F 2212/7207* (2013.01)

(58) Field of Classification Search
CPC ............... G06F 11/1072; G06F 11/108; G06F 11/1096; G06F 12/0246
See application file for complete search history.

(56) References Cited

U.S. PATENT DOCUMENTS

| | | | |
|---|---|---|---|
| 5,551,003 | A | 8/1996 | Mattson et al. |
| 6,463,503 | B1 | 10/2002 | Jones et al. |
| 8,176,235 | B2 | 5/2012 | Franceschini et al. |
| 8,271,550 | B2 | 9/2012 | Stephens et al. |
| 8,433,981 | B1 | 4/2013 | Agarwal et al. |
| 8,463,983 | B2 | 6/2013 | Eleftheriou et al. |
| 8,537,613 | B2 | 9/2013 | Sinclair et al. |
| 8,719,501 | B2 | 5/2014 | Flynn et al. |
| 8,954,657 | B1 | 2/2015 | Asnaashari et al. |
| 2002/0118582 | A1* | 8/2002 | Butterworth ............ G06F 3/061 365/200 |
| 2003/0120869 | A1 | 6/2003 | Lee et al. |
| 2008/0235306 | A1 | 9/2008 | Kim et al. |
| 2010/0017650 | A1 | 1/2010 | Chin et al. |
| 2011/0029715 | A1 | 2/2011 | Hu et al. |
| 2011/0283049 | A1 | 11/2011 | Kang et al. |
| 2012/0198174 | A1 | 8/2012 | Nellans et al. |
| 2014/0013027 | A1 | 1/2014 | Venkata et al. |
| 2014/0156965 | A1 | 6/2014 | Yang et al. |
| 2014/0201423 | A1 | 7/2014 | Jean et al. |

OTHER PUBLICATIONS

Search Report under Section 17(5) dated Jun. 2, 2014, International Application No. GB1322290.6, 3 pages.
Fujita, Hajime et al., "Log-Structured Global Array for Efficient Multi-Version Snapshots", Department of Computer Science, University of Chicago, Submitted for Publication Aug. 2014, 12 pages.
Hu, Xiao-Yu et al., "Container Marking: Combining Data Placement, Garbage Collection and Wear Levelling for Flash", 19th Annual IEEE International Symposium on Modelling, Analysis, and Simulation of Computer and Telecommunication Systems, Jul. 25-27, 2011, 11 pages.
Hu, Xiao-Yu et al., "Write Amplification Analysis in Flash-Based Solid State Drives", Proceedings of SYSTOR 2009: The Israeli Experimental Systems Conference 2009, Haifa, Israel, May 4-6, 2009, 9 pages.
Ioannou, Nikolas et al., "Method and Device for Managing a Memory", filed on Dec. 17, 2013, Patent Application No. 1322290. 6, 33 pages. (Abandoned on Jul. 15, 2014).
Thomasian, Alexander, "Disk Arrays with Multiple RAID Levels", ACM SIGARCH Computer Architecture News, vol. 41, No. 5, Dec. 2013, pp. 6-24.
Thomasian, Alexander et al., "Higher Reliability Redundant Disk Arrays: Organization, Operation, and Coding", ACM Transactions on Storage, vol. 5, No. 3, Article 7, Nov. 2009, 59 pages.

\* cited by examiner

TWO-LEVEL HIERARCHICAL LOG STRUCTURED ARRAY ARCHITECTURE WITH MINIMIZED WRITE AMPLIFICATION

BACKGROUND

The present application relates generally to an improved data processing apparatus and method and more specifically to mechanisms for a two-level log structured array (LSA) architecture with minimized write amplification.

Performance characteristics of NAND flash-based solid-state disks (SSDs) are fundamentally different from traditional hard disk drives (HDDs). Typically, data are organized in pages of 4, 8, or 16 KiB sizes. Page read operations are typically one order of magnitude faster than write operations, and unlike HDDs, latency depends on neither current nor previous location of operations. However, memory locations must be erased prior to writing to them. The size of an erase block unit is typically 256 pages. The erase operations take approximately one order of magnitude more time than a page write operation. Due to these inherent properties of the NAND flash technology, SSDs write data out-of-place and maintain a mapping table that maps logical addresses to physical addresses, i.e., the logical-to-physical table (LPT).

As flash chips/blocks/pages/cells might expose errors or completely fail due to limited endurance or other reasons, additional redundancy must be used within flash pages (e.g., error correction code (ECC) such as BCH) as well as across flash chips (e.g., RAID-5 or RAID-6 like schemes). While the addition of ECC in pages is straightforward, the organization of flash blocks into RAID-like stripes, referred to as "block stripes," is more complex because individual blocks have to be retired over time requiring either reorganizing the stripes or shrinking the capacity of the affected stripe.

Garbage collection must be performed on block stripes, rather than blocks, in order to reconstruct the data in case data in one block are lost. This organization of stripes, together with the LPT defines the placement of data. SSDs today use a log structured array (LSA) architecture, which combines these two techniques.

In write-out-of-place, a write operation will write new data to a new location in flash memory, thereby updating the mapping information and implicitly invalidating data at the old location. The invalidated data location cannot be reused until the entire block is garbage collected, which means any still valid data in the block must be relocated to a new location before the block can be erased. Garbage collection (GC) of a block is typically deferred as long as possible to reduce the number of valid pages that must be relocated. Upon garbage collection, pages that have to be relocated cause additional write operations; this is often denoted as write amplification.

Due to limited endurance of NAND flash devices, the reduction of write amplification is very important. In fact, with shrinking technology nodes in NAND flash, endurance is dropping, hence making any sort of write reduction or write elimination even more important. Note that the garbage collection unit of operation depends on the implementation details of the flash management logic, ranging from a flash block in a simple flash controller to a RAID stripe of flash blocks, referred to as a "block stripe," in case the flash controller implements RAID functionality at the flash channel level, or any other organization of flash blocks (e.g., Reed-Solomon codes) that the flash controller implements.

Existing flash arrays on the market include a set of independent flash nodes or SSDs connected to a RAID controller. The flash nodes operate independently of each other and manage the flash memory space in an LSA fashion. The RAID controller therefore does not see physical block addresses (PBAs) of the flash directly, but logical addresses referred to herein as node logical block addresses (nodeLBAs). Hosts access the flash array through a peripheral control interface express (PCIe), Fibre Channel, or similar interface that connects to the RAID controller. The RAID controller maps the host logical block address (hostLBA) space seen by the hosts to a nodeLBA space in an implicit way that does not require maintaining a mapping table. This requires no additional metadata or control structures. A logical block address such as a hostLBA or nodeLBA typically addresses a data storage unit of 4 KiB, 8 KiB, or 512 Bytes, and hence is not related to the Flash block size. These data storage units are also known as logical pages where one or more, entire or partial logical pages fit into a physical flash page. Also, the RAID controller does write-in-place updates as the LSA in each node below performs flash management functions transparently. However, in the case of small random writes, partial stripe writes cause two write operations for each user write operation: one for the data and another for the updated parity. As a result, for RAID-5 like schemes, small random writes add a factor of close to two to the system write amplification.

If user writes are written to the nodes in an LSA fashion inside the RAID controller, data to be written can be grouped into containers to reduce write amplification. A container may build a single RAID stripe. As updated logical pages are written as full stripe writes by the RAID controller, the above mentioned write amplification from RAID-5 is significantly reduced. For instance, if sixteen flash nodes are used, a RAID-5 scheme with fifteen data and one parity strips can be used, reducing write amplification to $\frac{1}{15}$.

Besides the ability to significantly reduce write amplification, stacking two levels of LSAs is also beneficial for data deduplication. This is due to the fact that an implicit mapping of hostLBAs to nodeLBAs would typically only allow less efficient node-level deduplication because deduplication is performed in each node independently. With an array-level LSA, deduplication can be performed at the array level. The higher level LSA knows on which flash node the data of a particular deduplication object or logical page is stored.

Although simple stacking of two LSAs—one on the array level and the other in the flash nodes—seems to be promising, there are significant problems related to such an approach. One approach may be to organize the container size to match the geometry of the underlying node stripe size such that when higher level GC does garbage collect a container, the corresponding underlying flash blocks are fully invalidated. Higher-level GC would do all relocation work while the lower-level GC would always see entirely invalid blocks being garbage collected. Unfortunately, even if the underlying geometry is known, those stripe sizes may be of variable length due to flash blocks being retired over time or failed planes (i.e., variable stripe RAID). For off-the-shelf SSDs, the geometry is usually unknown.

As it is very difficult to align the container size to the underlying node geometry, one can also simply perform garbage collection on the RAID controller and inside each node independent from each other. As those garbage collectors are running independently, additional write amplification is created. Worse, overprovisioning may be required on both levels, which wastes flash space or increases write amplification further.

SUMMARY

In one illustrative embodiment, a method is provided for coordinated garbage collection in an array controller of a two-level hierarchical log structured array architecture for a non-volatile memory array. The two-level hierarchical log structured array (LSA) architecture comprises an array-level LSA in the array controller and a node-level LSA in each node of the non-volatile memory array. The method comprises writing, by the array controller, logical pages of data at host logical block addresses to containers in memory of the array-level storage controller destined at node logical block addresses in an array-level LSA. The method further comprises mapping the node logical block addresses to physical block addresses in a node-level LSA in a plurality of nodes. The method further comprises identifying a first container to reclaim according to a predetermined garbage collection policy responsive to initiating array-level garbage collection in the array controller. The method further comprises moving the first valid logical page of data to a location assigned to the same node in a target container in the memory of the array-level storage controller, remapping the first valid logical page of data in a corresponding node, and reclaiming the first container responsive to determining the first container has at least a first valid logical page of data.

The illustrative embodiment significantly reduces the additional write amplification caused by the combination of a higher-level LSA with LSAs in the nodes. The illustrative embodiment modifies higher-level garbage collection such that valid logical pages are not relocated by that LSA, and instead the lower-level is informed about what data must be relocated, such that the execution of the relocation in the lower level is significantly cheaper with respect to write amplification, latency, and endurance, as only the mapping information must be updated for valid logical pages instead of actually moving the data to a new location. The illustrative embodiment results in a significant reduction in write amplification, as the lower-level GC sees all higher-level relocations as location updates instead of writes and sees higher-level invalidations in block as invalidations instead of no information being passed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
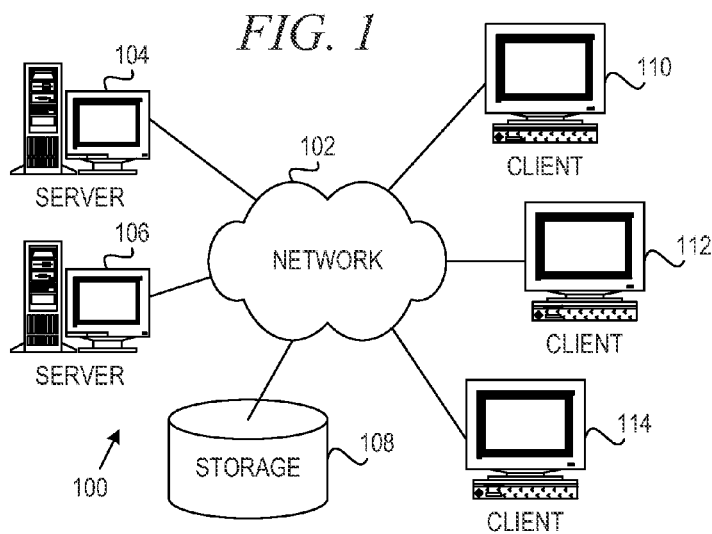
FIG. 1 is an example diagram of a distributed data processing system in which aspects of the illustrative embodiments may be implemented.

The illustrative embodiments provide a two-level hierarchical log structured array (LSA) architecture for flash arrays with minimized write amplification. The illustrative embodiments significantly reduce the additional write amplification caused by the combination of a higher-level LSA with LSAs in the nodes. The illustrative embodiments modify higher-level garbage collection such that valid logical pages are not relocated by that LSA, and instead the lower-level is informed about what data must be relocated. Then, the lower-level LSA performs the actual relocation. The execution of the relocation in the lower level is significantly cheaper with respect to write amplification, latency, and endurance, as only the mapping information must be updated for valid logical pages instead of actually moving the data to a new location. This results in a significant reduction in write amplification, as the lower-level GC sees all higher-level relocations as location updates instead of writes and sees higher-level invalidations in flash block as invalidations instead of no information being passed.

The techniques of the illustrative embodiments may be used when the relocations are performed within a single node. Therefore, the higher-level LSA must be able to identify a relocation destination for a hostLBA on the same node. For wear leveling, it might be necessary from time to time to relocate data from one node to another.

The use of off-the-shelf SSDs in flash arrays typically makes it difficult to transfer other information between any high-level LSA and the SSDs besides standardized SCSI commands. However, in one example embodiment, full control of the hardware and firmware stack of flash arrays and flash nodes allows this interface to be extended.

The higher level may use existing Trim/SCSI unmap commands to tell the lower level about which nodeLBAs have been invalidated. However, this approach still requires the actual relocation of all valid logical pages by the higher-level GC. Trim/SCSI unmap commands may be combined with the mechanisms of the illustrative embodiments.

Embodiments of the present invention can be implemented with a range of memory technologies, including for example solid state non-volatile random access memory (NVRAM) technologies such as NAND flash memory, NOR flash memory, phase-change memory (PCM), magnetoresistive RAM (MRAM), resistive RAM (RRAM) and combinations thereof.

Before beginning the discussion of the various aspects of the illustrative embodiments, it should first be appreciated that throughout this description the term "mechanism" will be used to refer to elements of the present invention that perform various operations, functions, and the like. A "mechanism." as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
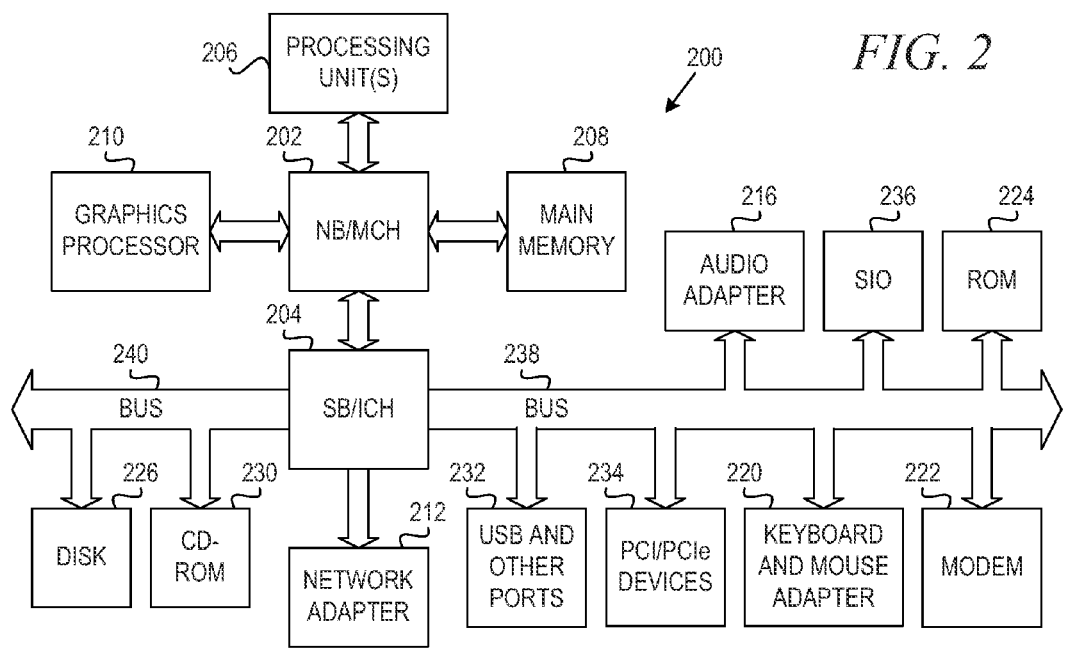
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP) or PCIe.

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Host Bus Adapters (HBAs), Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
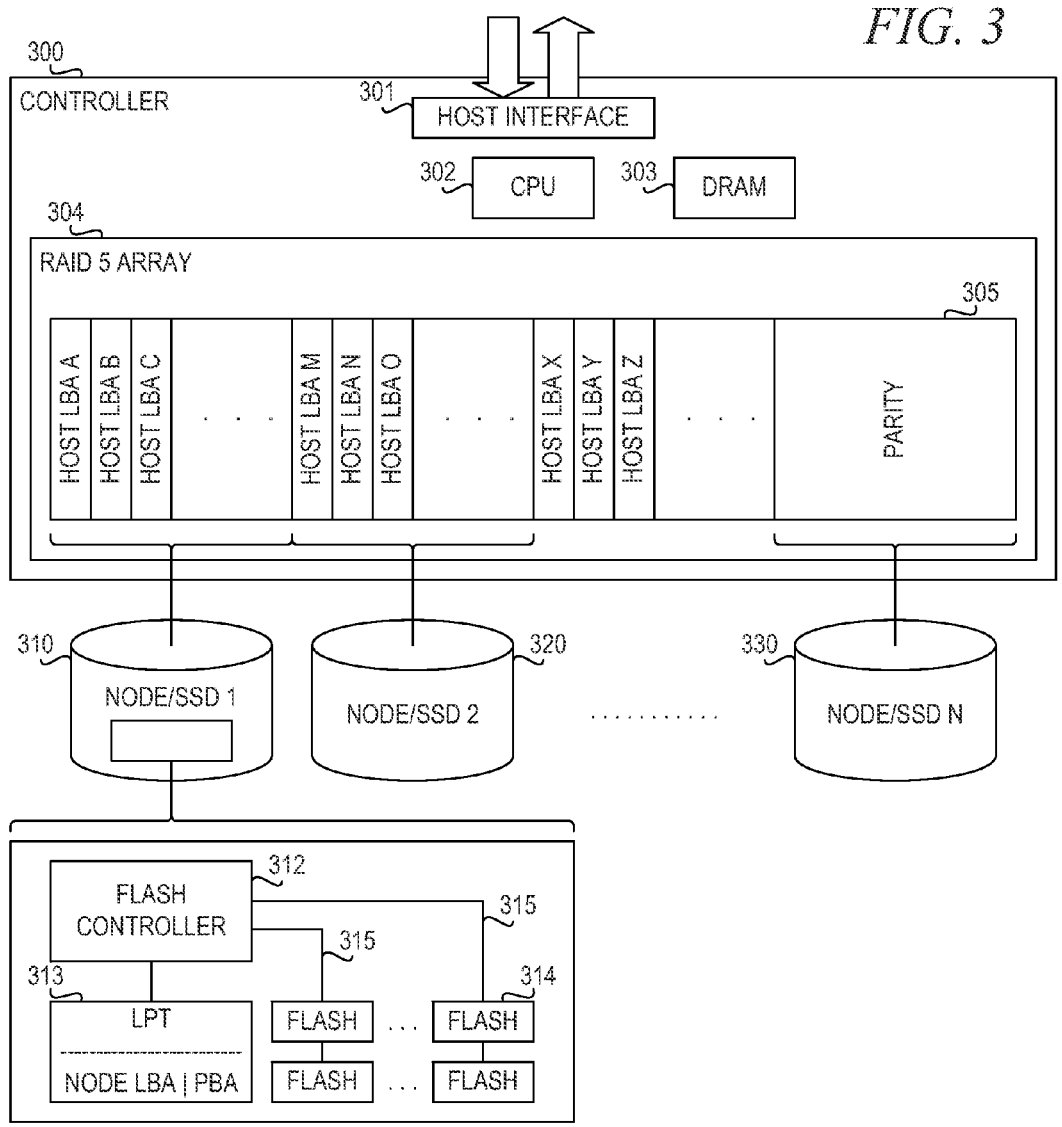
FIG. 3 is a block diagram of a flash array architecture in which aspects of the illustrative embodiments may be implemented.

FIG. 3 is a block diagram of a flash array architecture in which aspects of the illustrative embodiments may be implemented. Storage controller 300 receives storage access requests from a host via host interface 301. Storage controller includes central processing unit (CPU) 302 and dynamic random access memory (DRAM) 303. In the depicted example, storage controller 300 is a redundant array of independent disks (RAID) controller; therefore, storage controller 300 may also be referred to as a RAID controller. More specifically, controller 304 may implement RAID 5, which consists of block-level striping with distributed parity. In RAID 5, parity information is distributed among the drives. RAID 5 requires that all drives but one be present to operate. Upon failure of a single drive, subsequent reads can be calculated from the distributed parity such that no data are lost. Controller 304 may also implement another RAID or RAID-like scheme.

Storage controller 300 connects to flash nodes 310, 320, 330, which operate independently of each other. Storage controller 300 does not see physical block addresses (PBAs) of the flash memories directly; rather, storage controller 300 sees logical addresses referred to herein as host logical block addresses (hostLBAs). Hosts access the flash array through a bus (e.g., PCIe, FibreChannel, FCoE, etc.) connected to host interface 301. Controller 300 maps the host logical block address (hostLBA) space seen by the host to a nodeLBA space in an implicit way that does not require maintaining a mapping table. This requires no additional metadata or control structures.

Each flash node or solid-state disk (SSD) 310, 320, 330 includes a flash controller 312, a logical-to-physical address translation table (LPT) 313, and a plurality of flash memories 314. LPT 313 translates from a logical address (nodeLBA) to a physical address (physical block address) and writes each nodeLBA to one or more PBAs. One or more flash memories 314 are connected through a lane or flash channel 315 to the flash controller. In one particular embodiment, flash controller 312 uses RAID 5 to stripe writes to a plurality of flash memories 314 on different lanes.

In accordance with the illustrative embodiments, garbage collection (GC) on each node 310, 320, 330 starts when the number of free blocks in one lane falls below the garbage collection threshold ($GCT_{LOW}$), which may be sixty blocks, for example. GC replenishes the free block pool until the number of free block stripes available is above a high threshold ($GCT_{MAX}$).

In accordance with the illustrative embodiments, controller 300 stores writes to the hostLBA space in a RAID 5 array 304. In the depicted example, an array-level stripe 305 implicitly maps a first plurality of hostLBAs to flash node 310, a second plurality of hostLBAs to flash node 320, etc., and maps parity to flash node 330. Controller 300 stores each array-level stripe in memory, such as DRAM 303, until the container is full and then performs the writes to nodeL-BAs in flash nodes 310, 320, 330. For simplicity FIG. 3 only illustrates a single array-level stripe 305. Controller 300 may however store data for more than one array-level stripe 305 in DRAM 303. All array-level stripes 305 including those not stored in DRAM 303 are managed by controller 300 using dedicated meta-data stored in DRAM 303. Typically the location of the parity is rotating among the flash nodes and might be implicitly determined for each array-level stripe.

In an LSA, data is placed into containers (segments), which resemble RAID stripes with the difference that data is written in a log fashion. This appending of writes into containers requires an additional level of indirection which maps hostLBAs to nodeLBAs. Once a container is full, parity is generated and data can be destaged to disks. As a consequence, data in the container cannot be modified or updated (i.e., the container is closed) but only invalidated.

Generally, a container can be in one of the following states:

Free: No data is stored in the container. All free containers are placed into a free pool. While initially all containers are free, over time this pool only holds a small set of containers. A container leaves this state when it is selected for write allocation.

Write allocation: A container in this state has free storage locations and is currently used to place freshly written data into it. Only a small set of containers are in this state, because on the array level there is only limited amount of space that can be kept in memory (Typically a few Gigabytes in the write cache of the RAID controller). The container is closed when one decides to destage it. Once closed, data can no longer be written to this container. Typically a container is closed when it is full and then enters the destaging state. Occasionally, partially filled containers can be closed as well.

Destaging: As the container is now closed, the parity calculation can be completed and added to the container and the actual writing of data that needs to be written to the nodes is now done. Traditionally, in destaging state all logical pages holding data in the container are written to the storage nodes. In the illustrative embodiments, data that had been relocated (to location in the same node/SSD) due to garbage collection is remapped instead of written. Invalid logical pages are skipped. Once all data in the container has been written and/or remapped, the container is placed in the occupied pool and changes to the occupied state. Only a very small set of containers are typically in the destaging state or even none (when there is no write activity).

Occupied: Containers in this state hold valid or invalid data. In steady state, most containers will be in this state. Containers in this state are eligible for garbage collection.

Garbage collection: In this state all still valid data in the container is identified and relocated to new locations— preferably to a new location in the same node of a container in "write allocation" state such that data can be remapped instead of read and written. Alternatively, data can be relocated to another node. In the illustrative embodiments, the old location is invalidated (trimmed or unmapped) in this process. Once all relocations are done the container enters the free state.

Figure 4:
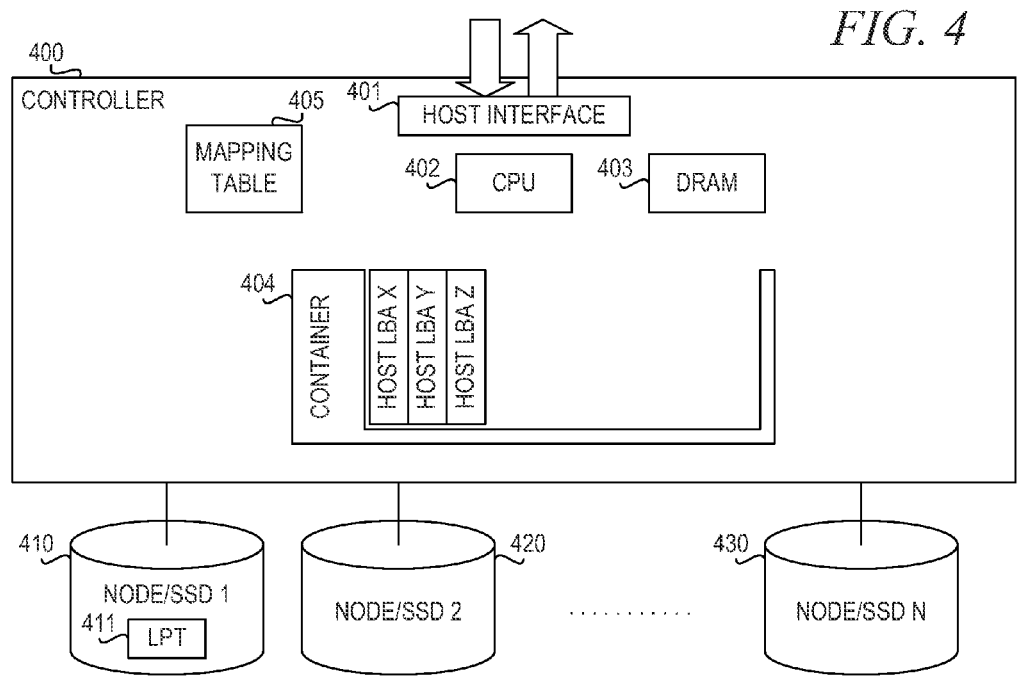
FIG. 4 is a block diagram of an LSA-based flash array in accordance with an illustrative embodiment.

FIG. 4 is a block diagram of an LSA-based flash array in accordance with an illustrative embodiment. RAID/LSA controller 400 receives storage access requests from a host via host interface 401. RAID/LSA controller 400 includes central processing unit (CPU) 402 and dynamic random access memory (DRAM) 403. RAID/LSA controller 400 connects to flash nodes 410, 420, 430, which operate independently of each other and manage flash memory space in a log-structured array (LSA) fashion. RAID/LSA controller 400 does not see physical block addresses (PBAs) of the flash memories directly; rather, RAID/LSA controller 400 sees logical addresses referred to herein as node logical block addresses (nodeLBAs).

In the illustrative embodiment, RAID/LSA controller 400 stores logical pages to container 404 in an LSA fashion, writing each new logical page with a hostLBA to a next nodeLBA. When container 404 is full, RAID/LSA controller 400 writes the logical pages to flash nodes 410, 420, 430. RAID/LSA controller 400 maps hostLBAs to nodeLBAs in flash nodes 410, 420, 430 using mapping table 405. The mapping table actually resides inside the DRAM. As it has to be made persistent, it could also be stored in some fast non-volatile memory such as PCRAM or MRAM once these memory technologies reach reasonable sizes. For simplicity FIG. 4 only illustrates a single container 404. Controller 400 may however store data for more than one container 404 in DRAM 403. All containers 404 including those not stored in DRAM 403 are managed by controller 400 using dedicated meta-data stored in DRAM 403.

Flash nodes 410, 420, 430 also write data to flash memories in an LSA fashion on the node level. Each flash node or solid-state disk (SSD) 410, 420, 430 includes a logical-to-physical address translation table (LPT) 411, which translates from a logical address (nodeLBA) to a physical address (physical block address (PBA)). The flash node controller (not shown) writes each nodeLBA to one or more PBAs.

In one illustrative embodiment, the higher-level LSA holds the entire hostLBA-to-nodeLBA mapping table 405 on a logical page granularity, and the nodes maintain the nodeLBA-to-PBA mapping tables 411. Mapping table 405 is an explicit mapping table. The table can be stored in DRAM 403 and protected against power failures (e.g. using battery-backed DRAM). In this approach, the higher-level GC knows exactly when a nodeLBA has been invalidated. Hence, upon GC, the valid logical pages are easily identified from mapping table 405, and the relocation information can be sent easily to the lower level. However, the single mapping table 405 in the RAID/LSA controller 400 has limited scalability and is not practical for large flash arrays. In one example embodiment, this may be solved by paging metadata, but this approach may significantly reduce overall performance. Alternatively, this may be solved using larger host page sizes (e.g., 64 KiB instead of 4 KiB) or distributing the mapping table in DRAM on the flash nodes, which could be directly accessed from the array controller. For example, each node may hold a sparse mapping table that maps hostLBAs to nodeLBAs stored in this node. The array-level LSA then only has to maintain a hostLBA to node mapping table which is significantly smaller.

Figure 5A:
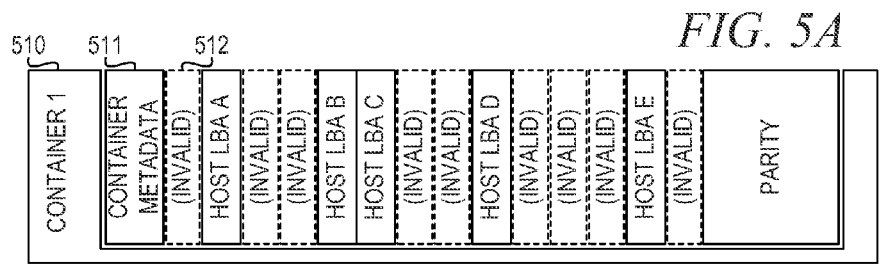
FIGS. 5A and 5B illustrate containers in an array-level LSA for relocation during garbage collection in accordance with an illustrative embodiment.
Figure 5B:
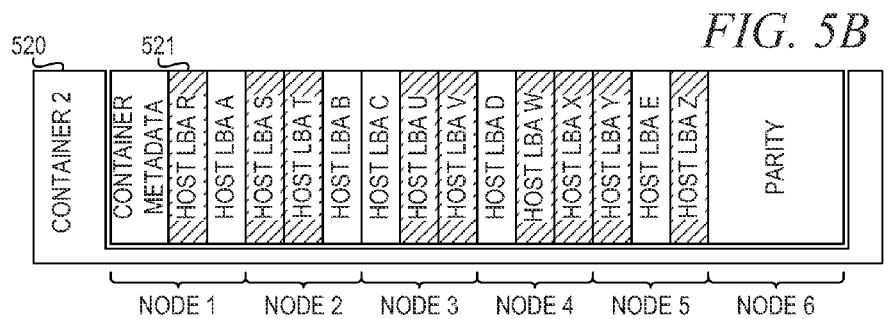

FIGS. 5A and 5B illustrate containers in an array-level LSA for relocation during garbage collection in accordance with an illustrative embodiment. More particularly, FIG. 5A illustrates a container 510 that is being garbage collected. Upon relocation of valid logical pages, first, RAID/LSA 400 controller must determine which logical pages must be relocated and on which node the valid data are currently stored. The node location information may be implicitly given by the data location in the container and/or the RAID/LSA controller 400 may store the hostLBAs held in container 510 in an additional container metadata header 511 that is stored together with the container data and is read upon GC such that there is no need to page in the mapping table entries. This even holds when a hostLBA had been overwritten and the container holding the old hostLBA-to-nodeLBA mapping is being garbage collected. In this case the array-level LSA would try to relocate a previously invalidated nodeLBA which the node will detect and hence indicate to the RAID/LSA controller that this nodeLBA does not need to be relocated. Based on hostLBAs held in the meta-data header 511, the relocation requests are created and then sent to the appropriate nodes to be executed. In case the node location information is implicit, the hostLBAs held in the container metadata is particularly useful when the RAID/LSA controller 400 has limited memory for the mapping table and uses paging of parts of the mapping table or distributes the mapping table to nodes. Together with a timestamp or write sequence counter, the container metadata 511 can also be used to reconstruct the hostLBA-to-nodeLBA mapping table in case of a failure.

As RAID/LSA controller 400 erases or overwrites logical pages, RAID/LSA controller 400 invalidates logical pages in container 510, such as logical page 512. Turning to FIG. 5B, the array-level GC places all still-valid data into a new container 520. In the depicted example, the valid data being relocated comprise hostLBA A, hostLBA B, hostLBA C, hostLBA D, and hostLBA E. After GC relocation, container 510 may be reclaimed, and the array-level LSA fills empty locations in container 520 with new user writes or GC relocations from the next container being garbage collected, such as the write to hostLBA R in logical page 521. RAID/LSA controller 400 writes only new data and new parity to the flash nodes. This scheme efficiently avoids maintaining a high number of open containers to place data. For example, the usage of more than one open container for data placement makes sense in conjunction with heat segregation.

Returning to FIG. 4, an important issue is when the hostLBA-to-nodeLBA mapping in mapping table 405 should be changed to the new location. It might be possible that a remap operation fails on a node. If the table update is performed at the time the relocation request is sent to the node 410, 420, 430, any following read request to that location could result in an I/O error. In one embodiment, to prevent this from happening, the relocation operation is split into two parts.

In one example embodiment, RAID/LSA controller 400 sends a map request to the node, such as node 410, which adds a new mapping entry for the nodeLBA in LPT 411. Node 410 then sends a first completion message back to the array-level LSA. Upon receiving the completion message, RAID/LSA controller 400 updates the nodeLBA in mapping table 405 and then sends an unmap request for the old nodeLBA to node 410, which removes the old entry from LPT 411 and sends back a second completion message.

In an alternative embodiment, LPT 411 in nodes 410 is unchanged, but mapping table 405 in RAID/LSA controller 400 is reduced to map hostLBAs to nodes. Such a mapping may be implicit (no additional metadata) or dynamic for larger host address ranges to keep the additional metadata information small. Again, RAID/LSA controller 400 may use an additional container metadata header to determine the correct nodeLBA for a particular logical page relocation request. An implicit mapping puts additional constraints on how data are filled into containers, which might result in additional write amplification because some containers might not be entirely filled with data.

In another embodiment, RAID/LSA controller 400 stores the hostLBA-to-nodeLBA mapping table 405 in a distributed fashion on each node 410, 420, 430 as a sparse table. Each node 410, 420, 430 then only holds hostLBA entries for the data stored on that node in its LPT 411. Alternatively, this distributed table could also map hostLBAs to PBAs in the same distributed and sparse fashion. Clearly, the LPT 411 which maps nodeLBAs to PBAs would still be required in these cases as the array-level GC operates on the nodeLBA address space.

Traditional SSDs or flash nodes 410, 420, 430 typically store the nodeLBA inside a flash page and use that value upon node GC. Any relocation triggered by the higher level will invalidate this information in the flash page. Using a reverse map would be costly. Therefore, the flash node 410 may store the hostLBA or a unique ID in the flash page to identify the page. In case of adding the hostLBA, the flash node may use a lookup protocol that allows a node to get the current nodeLBA for a given hostLBA through the higher level LSA. In case of a unique ID, the node may store the unique ID in the node LPT.

One important aspect of the illustrative embodiments is the data placement of relocations into containers upon garbage collection in the array-level LSA. Data remapping can only happen when the new location is on the same node. However, during garbage collection, there might be no free space in the container for the particular node. In this case, array-level GC would have to relocate data from one node to another node with enough free space left.

Figure 6:
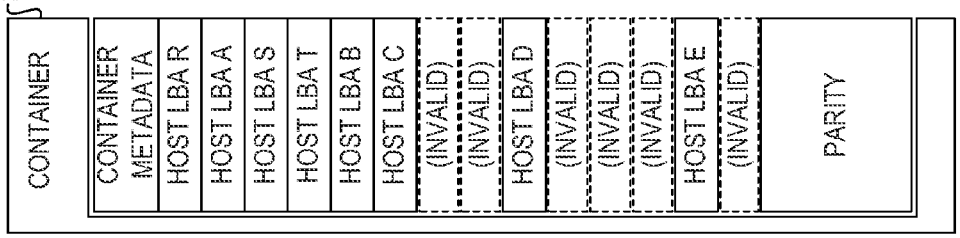
FIG. 6 illustrates a container to be written to nodes with unused locations marked as invalid in accordance with an illustrative embodiment.

It is important to note that the number of logical pages to be relocated is typically significantly lower than new host writes when the overprovisioning is chosen judiciously. Nevertheless, in some rare cases it might not be possible to fill up the container entirely. FIG. 6 illustrates a container to be written to nodes with unused locations marked as invalid in accordance with an illustrative embodiment. When the array-level LSA writes container 610 to the flash nodes, the RAID controller does not write data for invalid locations. Instead, the container metadata maintains a bitmap of all valid locations in container 610, which may be used in case the container must be reconstructed. For calculation of the parity, the RAID controller can simply assume that all invalid logical pages are holding zeros and hence effectively skipping those pages in the parity calculation.

The RAID controller performs actual writes to the nodes only for the new host data and the parity. In conjunction with implicit mapping of hostLBAs to nodes, the number of partially filled containers might be substantial, which in turn leads to increased write amplification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
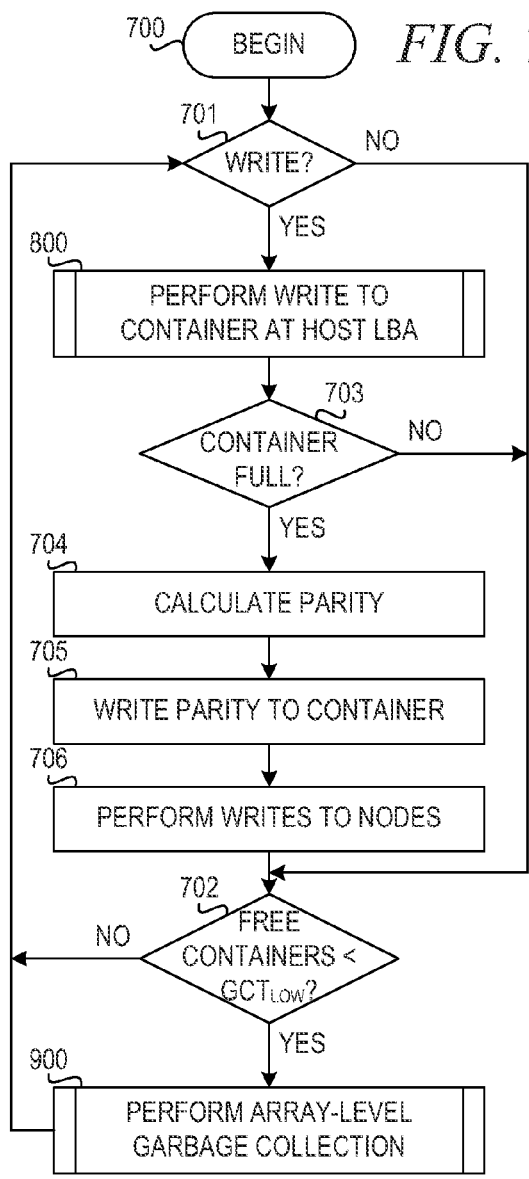
FIG. 7 is a flowchart illustrating operation of a mechanism for managing garbage collection in the array-level of a two-level hierarchical log structured array architecture for flash arrays in accordance with an illustrative embodiment.

FIG. 7 is a flowchart illustrating operation of a mechanism for managing garbage collection in the array-level of a two-level hierarchical log structured array architecture for flash arrays in accordance with an illustrative embodiment. Operation begins (block 700), and the mechanism determines whether a write request is received (block 701). If a request to write data is not received in block 701, the mechanism determines whether the number of free containers is less than the low garbage collection threshold (arrayGCT$_{LOW}$) (bock 702). If the number of free containers is less than arrayGCT$_{LOW}$, then the mechanism triggers performing array-level garbage collection (block 900). Operation of performing array-level garbage collection is described in further detail below with reference to FIG. 9. If the number of free containers is not less than GCT$_{LOW}$ in block 702, then operation returns to block 701 to determine whether a write request is received.

If a request to write data to a host logical block address (hostLBA) is received, the mechanism performs a write to the container at the hostLBA (block 800). The operation of performing the write is described in further detail below with reference to FIG. 8. Then, the mechanism determines whether the container is full of valid data (bock 703). If the container is not full, then operation proceeds to block 702 to determine whether the number of free containers is less than arrayGCT$_{LOW}$.

If the container is full of valid data in block 703, the mechanism calculates parity for the stripe (block 704), writes the parity to the container (block 705), and issues writes to the nodes (block 706). Thereafter, operation proceeds to block 702 to determine whether the number of free containers is less than GCT$_{LOW}$.

Figure 8:
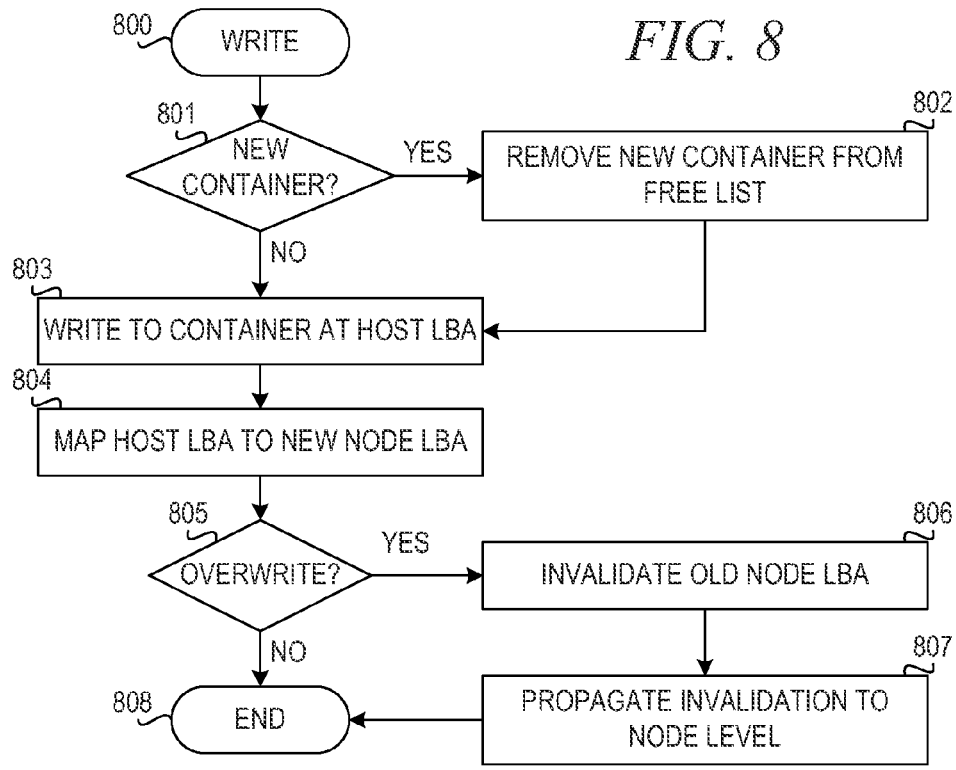
FIG. 8 is a flowchart illustrating operation of a mechanism for performing write operations at the array level in accordance with an illustrative embodiment.

FIG. 8 is a flowchart illustrating operation of a mechanism for performing write operations at the array level in accordance with an illustrative embodiment. Operation begins when receiving a request to write data to a host logical block address (host LBA) (block 800). The mechanism then determines whether the write requires a new container (block

801). If the write requires a new container, the mechanism removes a new container from the free list (block 802). Thereafter, or if the write does not require a new container in block 801, the mechanism writes the data to the container at a new hostLBA (block 803). Then, the mechanism maps the hostLBA to the new nodeLBA (block 804). Next, the mechanism determines whether the write is a write to a new hostLBA or overwrites a previously written hostLBA (block 805). If the write is an overwrite, the mechanism invalidates the old nodeLBA (block 806), and propagates the invalidation to the node level (block 807).

Thereafter, or if the write is not an overwrite in block 804, operation ends (block 808). Note that the update of the new mapping in the node LPT will happen with the write operation issued in 706.

Figure 9B:
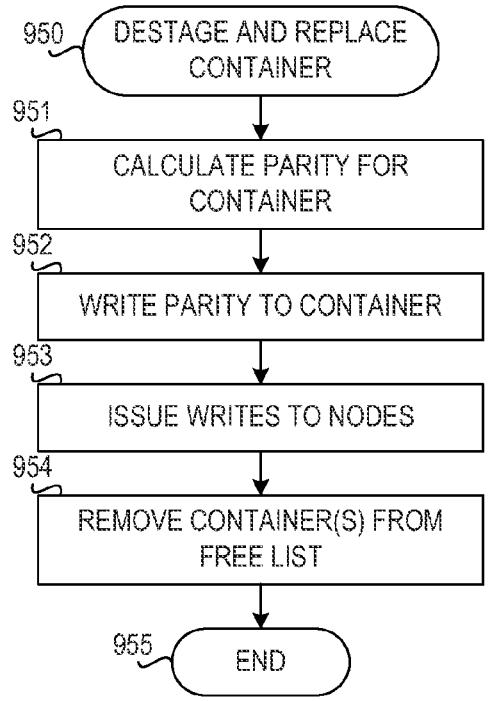
FIG. 9B is a flowchart illustrating operation of a mechanism for destaging and replacing a container for write allocation accordance with an illustrative embodiment.
Figure 9A:
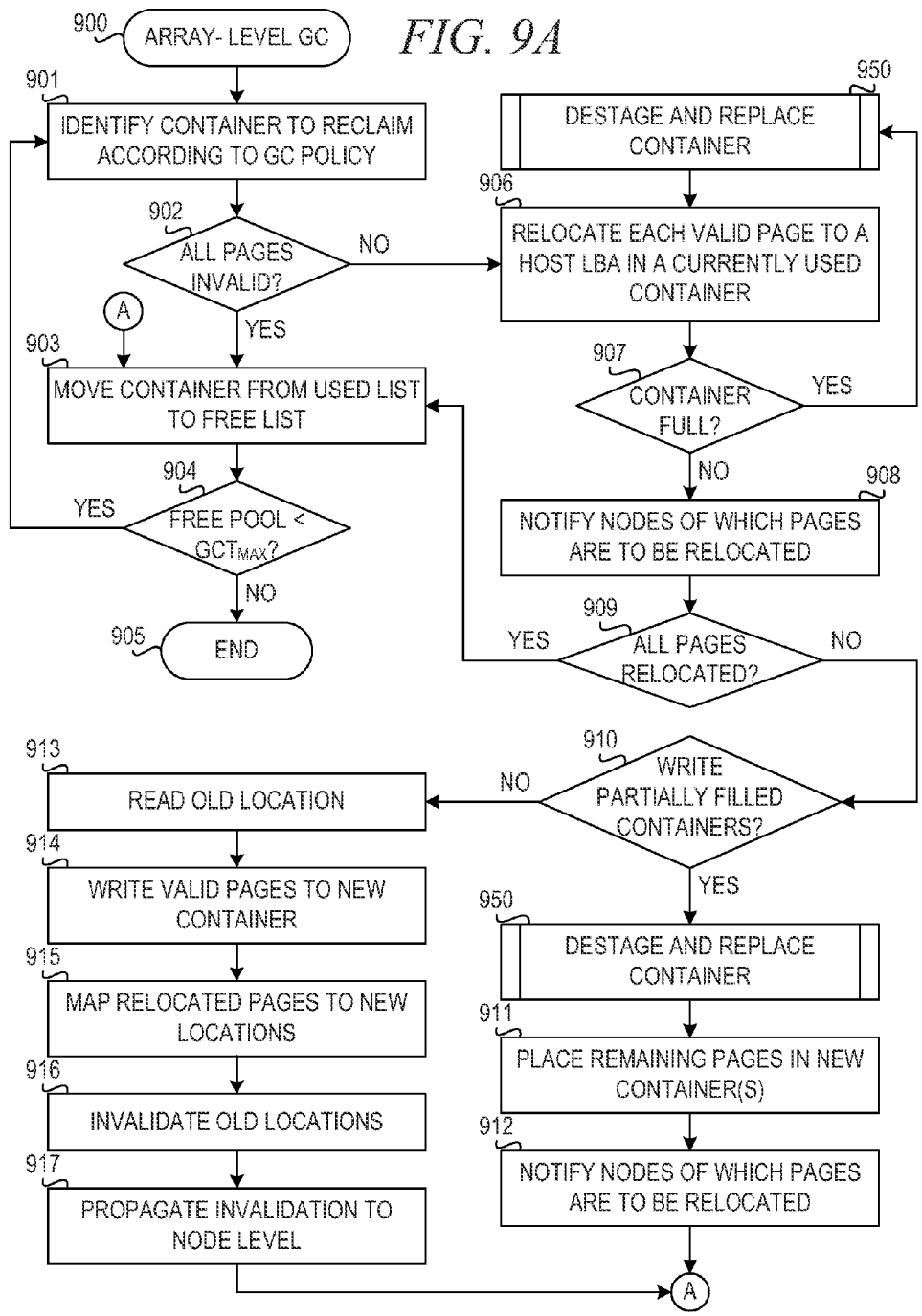
FIG. 9A is a flowchart illustrating operation of a mechanism for performing array-level garbage collection in accordance with an illustrative embodiment.

FIG. 9A is a flowchart illustrating operation of a mechanism for performing array-level garbage collection in accordance with an illustrative embodiment. Operation begins when the array-level LSA initiates array-level garbage collection (block 900), and the mechanism identifies a container to reclaim according to the garbage collection (GC) policy (block 901). The mechanism then determines whether all logical pages of the identified container are invalid (block 902). If all logical pages are invalid, the mechanism moves the container from the used list to the free list (block 903).

Thereafter, the mechanism determines whether the pool of free containers is less than the high garbage collection threshold (arrayGCT$_{MAX}$) (block 904). If the number of containers in the free pool is less than arrayGCT$_{MAX}$, then operation returns to block 901 to identify the next container to reclaim. If the number of containers in the free pool is greater than or equal to arrayGCT$_{MAX}$, then operation ends (block 905).

If at least one logical page is valid in the identified container in block 902, then the mechanism tries to relocate each valid logical page to a hostLBA in one of the containers currently used to absorb relocations of freshly written data in a way that the old and new location of each logical page stays on the same node (block 906). As the garbage collected container and the one or more containers used for write allocation are in different states they cannot be the same container. If the relocation of any valid page cannot be completed because the currently used one or more containers for write allocation are full (block 907: YES), a currently used container is destaged and replaced with a fresh one from a free list in block 950. The operation of performing the destaging and replacement is described in further detail below with reference to FIG. 9B. For all valid logical pages that could be placed into new locations, the mechanism proceeds with notifying the nodes of which logical pages are to be relocated (block 908) and then determines whether all pages were relocated to new locations (block 909). Note that the currently used container may also have new data from a previous operation which will only be written out to the nodes when the container is being destaged. As the currently used container is not yet full, there is no need to destage it at this point in time. Thereafter, operation proceeds to block 903 to move the garbage collected container to the free list.

If it is detected that one or more valid pages did not fit into the preferred locations of a container in block 909, the mechanism determines whether one or more partially filled containers 610 should be written to the nodes (block 910). If this is the case, the mechanism triggers the destaging and replacement of the partially filled container in block 950 and the remaining valid pages to be relocated will be placed into the new container used for write allocation to locations into the same node (block 911) before proceeding to block 912 to notify nodes of which blocks are to be relocated. The mechanism then proceeds with moving the garbage collected container to the free list in block 903.

The decision to write partially filled containers (block 910) may be based on the filling level of the containers, current write amplification, wear imbalance of nodes, etc. If the mechanism decides not to write partially filled containers in block 910, the relocation of remaining valid blocks is done by placing the one or more logical pages on a different node which will trigger a read from the old location (block 913) before the data can be written to the new container (block 914). The mechanism then proceeds to map the relocated logical pages to new locations (block 915) and invalidate their old locations (block 916) on the array level. Then the nodes are notified of which pages are to be relocated in block 917. The operation proceeds to block 903 to move the cleaned up container from the used list to the free list and to determine whether garbage collection is complete in block 904.

Note that on the node level pages that were moved to a different node will only see the old location being invalidated in this step. The new mapping will be updated once the container is destaged and written to the nodes in a similar way as described with reference to FIG. 7.

Also note that in block 914 the currently used container for write allocation might be completely filled up. This particular case not illustrated in FIG. 9A for facility of inspection includes for all pages that have been written to different nodes, mapping the relocated pages to new locations on the array level (block 915), invalidating the old location on the array level (block 916), and propagating the invalidations to the node level (block 917). In addition, the full container may destaged and replaced (block 950) and all remaining pages that need to be relocated can now be easily placed to locations in the same node in the new container and the nodes can be notified about these relocations in the same way this is being described in blocks 911 and 912.

As described above, to avoid I/O errors due to a remap operation failing on a node, the mechanism may split the relocation operation into two parts. First the mechanism sends a map request to the node, which adds a new mapping entry for the new nodeLBA in the LPT. The node sends a completion message back to the array-level LSA. Upon receiving the completion message, the mechanism updates the nodeLBA and then sends an unmap request for the old nodeLBA to the node. The node then sends back a completion message.

FIG. 9B is a flow chart illustrating the destaging and replacement of a container for write allocation. Operation begins when the array-level garbage collection mechanism decided to destage a container for write allocations (block 950). The container being destaged can be entirely or partially filled. The mechanism calculates parity for the container in block 951. Doing so, may require reading relocated data from the nodes. In case the container is partially filled, locations in the container not holding data are marked as invalid and the RAID controller can simply assume that all invalid logical pages are holding zeros thereby effectively skipping those pages in the parity calculation The parity is then written into the foreseen location in the container (block 952). At this point, the container is ready to be written to the nodes and the appropriate writes are issued in block 953. In the best case when the container only holds relocated data that had been remapped to locations on the same nodes, only meta-data and new parity needs to be written to the nodes. Otherwise, when the container holds relocated data that moved nodes and/or new data written by the host, these data have to be written to the nodes as well. The mechanism then removes another container from the free list, which will be used as the new container for write allocations in block 954 before operation ends in block 955.

Figure 10:
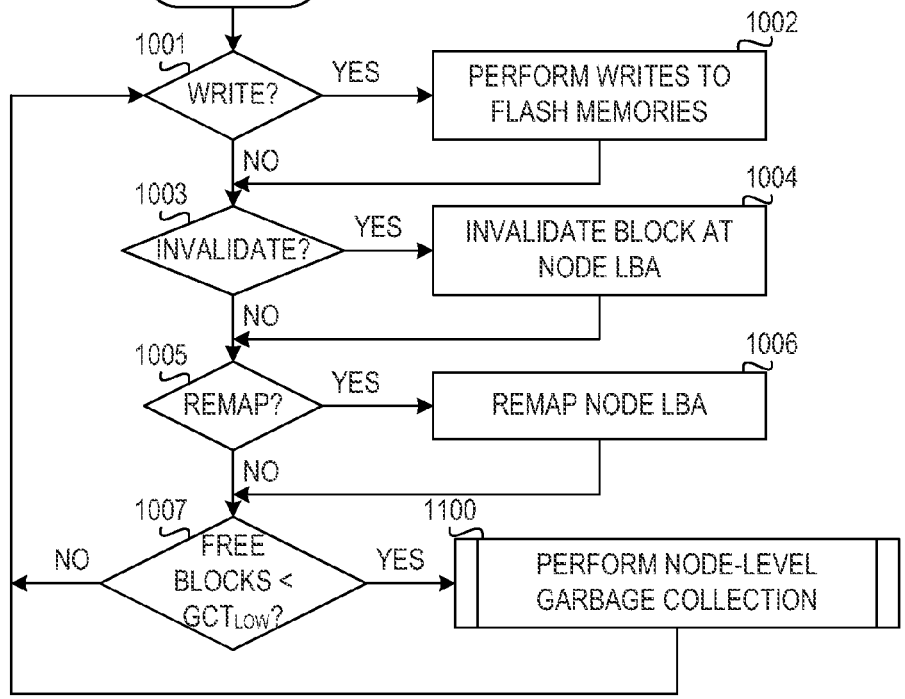
FIG. 10 is a flowchart illustrating operation of a mechanism for managing garbage collection in the node-level of a two-level hierarchical log structured array architecture for flash arrays in accordance with an illustrative embodiment.

FIG. 10 is a flowchart illustrating operation of a mechanism for managing garbage collection in the node-level of a two-level hierarchical log structured array architecture for flash arrays in accordance with an illustrative embodiment. Operation begins (block 1000), and the mechanism determines whether a request to write data to a nodeLBA is received from the array-level LSA (block 1001). If a write request is received, the mechanism performs writes to the flash memories in the node to write the data across the flash memories (block 1002). In one example embodiment, the mechanism stripes the data across a plurality of flash memories using RAID policy.

Thereafter, or if a write request is not received in block 1001, the mechanism determines whether an invalidation is received from the array-level log structured array (LSA) (block 1003). For each nodeLBA or hostLBA invalidated in the array-level LSA, the array controller sends an invalidation notification for the corresponding nodeLBA to the appropriate node. Note that nodeLBAs are typically invalidated by overwrites or array-level garbage collection, whereas hostLBAs are invalidated by trim commands received by the storage controller 300 through the host interface 301 from hosts. Array-level garbage collection invalidates whole blocks at the node level. If an invalidation notification is received, the mechanism invalidates the block(s) at the nodeLBA in the LPT of the node (block 1004). Note, in case the nodes hold a sparse hostLBA-to-nodeLBA or hostLBA-to-PBA mapping table the invalidations also updated in these tables.

Thereafter, or if an invalidation is not received in block 1003, the mechanism determines whether a remap message is received from the array-level LSA (block 1005). If the mechanism receives a remap message, the mechanism remaps a new nodeLBA to the PBA(s) at which the data are stored (block 1006). Again, if the nodes hold a sparse hostLBA-to-nodeLBA or hostLBA-to-PBA mapping table the mappings are also updated in these tables. As described above, in one example embodiment, the mechanism may split the remap operation into two parts. In this embodiment, the node receives a map request and adds a new entry for the new nodeLBA in the LPT, sends back a completion message, receives an unmap request for the old nodeLBA, removes the old entry for the old nodeLBA from the LPT, and sends a second completion message.

Thereafter, or if a remap message is not received in block 1005, the mechanism determines whether the number of free blocks is less than the low garbage collection threshold for the node (nodeGCT$_{LOW}$) (bock 1007). If the number of free blocks is less than nodeGCT$_{LOW}$, then the mechanism performs node-level garbage collection (block 1100). Operation of performing node-level garbage collection is described in further detail below with reference to FIG. 11. If the number of free blocks is not less than nodeGCT$_{LOW}$ in block 1007, then operation returns to block 1001 to determine whether a write request is received.

Figure 11:
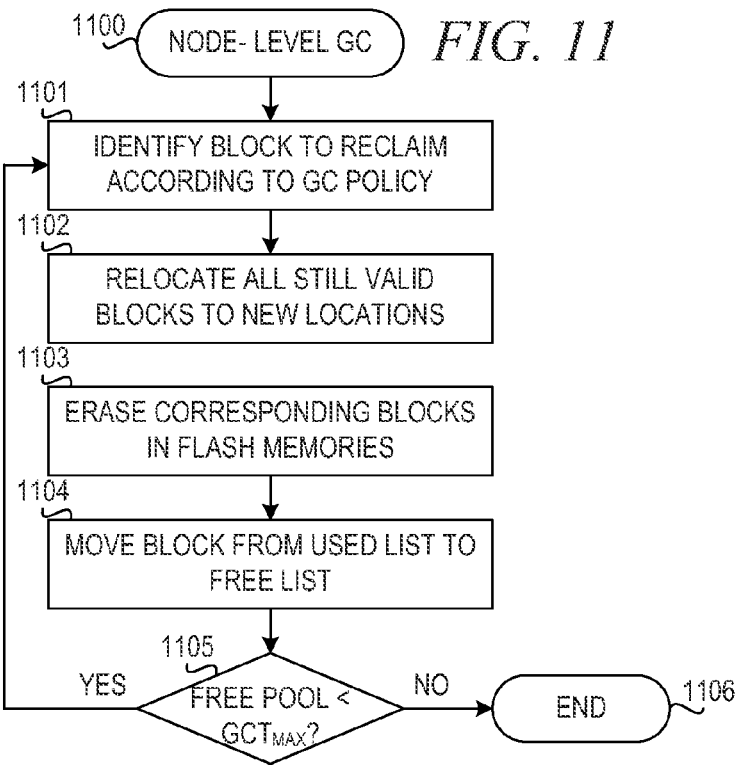
FIG. 11 is a flowchart illustrating operation of a mechanism for performing node-level garbage collection in accordance with an illustrative embodiment.

FIG. 11 is a flowchart illustrating operation of a mechanism for performing node-level garbage collection in accordance with an illustrative embodiment. Operation begins when the node-level LSA initiates node-level garbage collection (block 1100), and the mechanism identifies a block to reclaim according to the garbage collection (GC) policy (block 1101). Then, the mechanism relocates all still valid blocks to new locations in case there exists such valid blocks (block 1102), erases corresponding blocks in the flash memories (block 1103), and moves the block from the used list to the free list (block 1104).

Thereafter, the mechanism determines whether the pool of free blocks is less than the high garbage collection threshold (nodeGCT$_{MAX}$) (block 1105). If the number of blocks in the free pool is less than nodeGCT$_{MAX}$, then operation returns to block 1101 to identify the next block to reclaim. If the number of blocks in the free pool is greater than or equal to nodeGCT$_{MAX}$, then operation ends (block 1106).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for coordinated garbage collection in an array-level storage controller of a two-level hierarchical log structured array architecture for a non-volatile memory array, wherein the two-level hierarchical log structured array (LSA) architecture comprises an array-level LSA in the array-level storage controller and a node-level LSA in each node of the non-volatile memory array, the method comprising:
   writing, by the array-level storage controller, logical pages of data to containers in memory of the array-level storage controller at host logical block addresses in an array-level LSA;
   mapping the host logical block addresses to node logical block addresses in a node-level LSA in a plurality of nodes;
   responsive to initiating array-level garbage collection in the array-level storage controller, identifying a first container to reclaim according to a predetermined garbage collection policy; and
   responsive to determining the first container has at least a first valid logical page of data, moving the first valid logical page of data to a location assigned to the same node in a target container in the memory of the array-level storage controller, remapping the first valid logical page of data in a corresponding node, and reclaiming the first container.

2. The method of claim 1, wherein the first valid logical page of data is written at a first node logical block address, wherein the array-level LSA maps the first host logical block address to a first node logical block address in a first node in a mapping table, wherein the node-level LSA maps the first node logical block address to a first physical block address in a logical-to-physical address translation (LPT) table.

3. The method of claim 2, wherein the mapping table is stored in a distributed fashion on the nodes such that the array-level storage controller accesses the table through a paging mechanism for entries not cached in the array-level storage controller.

4. The method of claim 2, wherein remapping the first valid logical page of data comprises notifying the first node that the first node logical block address is to be remapped, wherein the first node remaps the first physical block address to a new node logical block address.

5. The method of claim 4, wherein remapping the first valid logical page of data comprises:
   sending a map request to the first node, wherein the map request instructs the node-level LSA to map the new node logical block address, wherein the first node adds a new mapping entry to map the new node logical block address to the first physical block address in the LPT table in response to receiving the map request;
   responsive to receiving a first completion message from the first node, sending an unmap request to the first node, wherein the unmap request instructs the node-level LSA to unmap the first node logical block address, wherein the first node removes a previous mapping entry that mapped the first node logical block address to the first physical block address.

6. The method of claim 2, wherein writing logical pages of data to containers in memory of the array-level storage controller comprises writing a container metadata header to each container, wherein the container metadata header stores the host logical block addresses for each of the logical pages in the container.

7. The method of claim 6, where the mapping table in the array-level storage controller maps host logical block addresses to nodes, and an additional table in each node maps host logical block addresses to node logical block addresses, wherein each given node maintains entries for host logical block addresses stored in the given node.

8. The method of claim 1, further comprising:
   responsive to determining the first container had no valid logical pages of data, reclaiming the first container.

9. The method of claim 1, wherein responsive to writing relocated logical pages to a new container, the remaining logical pages in the new container are written with data from a next container being garbage collected or from new host writes.

10. The method of claim 1, wherein each container corresponds to a RAID stripe, the method further comprising:
    responsive to a given container being full of valid data, calculating parity for the RAID stripe;
    writing the parity to the given container; and
    writing the data and the parity from the given container to the plurality of nodes.

11. The method according to claim 10, wherein a bitmap of valid pages is maintained in container metadata, the writing of the parity into the container and writing of data and the parity from the given container to the plurality of nodes is performed before the container is full, and each invalid page marked in the bitmap is skipped from the parity calculation and writing to the nodes.

12. The method of claim 1, wherein the first valid logical page of data is written at a first host logical block address, wherein the array-level LSA maps the first host logical block address to the first node in a mapping table, wherein a container metadata header in the first container stores the host logical block addresses and corresponding node logical block addresses in the first container.

13. A computer program product comprising a computer readable storage medium having a computer readable program stored therein, wherein the computer readable program, when executed on a computing device, causes the computing device to implement coordinated garbage collection in an array-level storage controller of a two-level hierarchical log structured array architecture for a non-volatile memory array, wherein the two-level hierarchical log structured array (LSA) architecture comprises an array-level LSA in the array-level storage controller and a node-level LSA in each node of the non-volatile memory array, wherein the computer readable program causes the computing device to:
   write logical pages of data to containers in memory of the array-level storage controller at host logical block addresses in an array-level LSA;
   map the host logical block addresses to node logical block addresses in a node-level LSA in a plurality of nodes;
   responsive to initiating array-level garbage collection in the array-level storage controller, identify a first container to reclaim according to a predetermined garbage collection policy; and responsive to determining the first container has at least a first valid logical page of data, move the first valid logical page of data to a location assigned to the same node in a target container in the memory of the array-level storage controller, remap the first valid logical page of data in a corresponding node, and reclaim the first container.

14. The computer program product of claim 13, wherein the first valid logical page of data is written at a first node logical block address, wherein the array-level LSA maps the first host logical block address to a first node logical block address in a first node in a mapping table, wherein the node-level LSA maps the first node logical block address to a first physical block address in a logical-to-physical address translation (LPT) table.

15. The computer program product of claim 14, wherein the mapping table is stored in a distributed fashion on the nodes such that the array-level storage controller accesses the table through a paging mechanism for entries not cached in the array-level storage controller.

16. The computer program product of claim 14, wherein remapping the first valid logical page of data comprises notifying the first node that the first node logical block address is to be remapped, wherein the first node remaps the first physical block address to a new node logical block address.

17. The computer program product of claim 16, wherein remapping the first valid logical page of data comprises:
sending a map request to the first node, wherein the map request instructs the node-level LSA to map the new node logical block address, wherein the first node adds a new mapping entry to map the new node logical block address to the first physical block address in the LPT table in response to receiving the map request;
responsive to receiving a first completion message from the first node, sending an unmap request to the first node, wherein the unmap request instructs the node-level LSA to unmap the first node logical block address, wherein the first node removes a previous mapping entry that mapped the first node logical block address to the first physical block address.

18. The computer program product of claim 14, wherein writing logical pages of data to containers in memory of the array-level storage controller comprises writing a container metadata header to each container, wherein the container metadata header stores the host logical block addresses for each of the logical pages in the container.

19. The computer program product of claim 13, wherein the first valid logical page of data is written at a first host logical block address, wherein the array-level LSA maps the first host logical block address to the first node in a mapping table, wherein a container metadata header in the first container stores the host logical block addresses and corresponding node logical block addresses in the first container.

20. An apparatus comprising:
a processor; and
a memory coupled to the processor, wherein the memory comprises instructions which, when executed by the processor, cause the processor to implement coordinated garbage collection in an array-level storage controller of a two-level hierarchical log structured array architecture for a non-volatile memory array, wherein the two-level hierarchical log structured array (LSA) architecture comprises an array-level LSA in the array-level storage controller and a node-level LSA in each node of the non-volatile memory array, wherein the instructions cause the processor to:
write logical pages of data to containers in memory of the array-level storage controller at host logical block addresses in an array-level LSA;
map the host logical block addresses to node logical block addresses in a node-level LSA in a plurality of nodes;
responsive to initiating array-level garbage collection in the array-level storage controller, identify a first container to reclaim according to a predetermined garbage collection policy; and
responsive to determining the first container has at least a first valid logical page of data, move the first valid logical page of data to a location assigned to the same node in a target container in the memory of the array-level storage controller, remap the first valid logical page of data in a corresponding node, and reclaim the first container.

* * * * *